Patented Mar. 4, 1952

2,587,806

UNITED STATES PATENT OFFICE 2,587,806

STABILIZED PLASTIC TYPE CONFECTION AND METHOD OF MAKING THE SAME

Justin J. Alikonis, Bloomington, Ill., assignor to Paul F. Beich Company, Bloomington, Ill., a corporation of Illinois No Drawing. Application February 24, 1949, Serial No. 78,221

3 Claims. (Cl. 99—134)

This invention pertains to an improved confectionery product of the plastic, chewy type and to an improved method for producing the same.

It is a well known fact that chewy confectionery products have an objectionable tendency to "leak" or fail structurally by breaking down to a syrupy, sticky consistency, under the effect of elevated temperature or high humidity. Candies of the sort referred to, typified by chewy nougat, caramel, mixtures thereof and like compositions, are to be clearly distinguished, in respect to this inability to withstand elevated temperature and high humidity without mechanically failing or leaking, from other types of confection, such as hard candies or those having a marshmallow texture, or a sugar-grained, sugar stabilized texture, for example, fudge, or a jellied texture, such as gumdrops and jelly beans possess. Moreover, none of these types combine the amorphous texture and chewy consistency characteristic of plastic nougat, caramel and related confections which are the subject matter of the present improvements. I have found it to be impossible to impart desired stability to confections of this chewy type by use of various gums, starches and pure food chemical stabilizers now on the market.

It is therefore a general object of the invention to provide an improved, stabilized, plastic type confection of the chewy variety which is proof against mechanical failure, softening, running or leaking at elevated temperatures and relatively high humidities.

Another general object of the invention is to provide such an improved, plastic type confection which, in addition to its characteristic chewy texture, has an internal cellular or filamentary structure provided by a multiplicity of thin, microscopic films which are entangled with one another within the body of the confection in what may be termed a brushwood fashion, and which serve to confine or compartmentize the hygroscopic confectionery mass and thus eliminate running or leaking under the conditions mentioned.

Yet another object is to provide an improved candy product of the type referred to, and a method for producing the same, in which the aforesaid attribute of stability is attained without adding to the candy ingredients any of the various gums, starches or chemical stabilizers heretofore employed; without the use of buffers or other materials of a possibly toxic character; and, in fact, without incorporating in the candy any non-nutritive material or any substantial amount of any material other than the normal candy ingredients, which would be apt to alter the taste, purity or texture of the resulting confection.

Another object of the invention is to provide an improved plastic confection and method for making the same involving the careful and complete hydration in cold water of a suitable soluble alginate, the subsequent mixing and cooking of this aqueous solution with other ingredients of the confection, the final addition to the cooked mixture of a soluble or insoluble calcium salt, whereby to produce in the resultant confection a fibrous, water insoluble, cellular or filamentary supporting or compartmentizing structure serving to mechanically restrain the hygroscopic confection materials, and wherein the aforesaid structure is undetectable by the palate of the consumer.

A still further object is to provide an improved method of manufacturing chewy candy in which a readily available soluble alginate is mixed with certain candy ingredients under carefully controlled conditions, followed by the cooking of the mixture, and in which sufficient of a soluble or insoluble calcium salt is thereafter introduced into the cooked mixture in at least the stoichiometric equivalent to produce a complete metathetic change of said soluble alginate to an insoluble calcium alginate having the tangled filamentary or cell-like structure referred to above.

Generally considered, it is an object of the invention to provide a novel and improved type of plastic confection, characterized by the stability thereof and its resistance to mechanical failure, running and leaking under high temperature, high humidity and at high altitude, yet which still maintains the desired plastic, non-granular, chewy nature characteristic of nougat and caramel confections.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the art of making confectionery it is known that certain water soluble alginates, for example, sodium alginate, can be reacted with an insoluble or soluble calcium salt, for example, calcium lactate, to form a gel embodying an insoluble alginate, i. e., calcium alginate in the instanced form. This knowledge has been used for many years in the manufacture of non-chewy jelly-like confections such as gumdrops and jelly beans, also in the production of ice cream, in which the calcium lactate naturally found in the milk ingredient of the ice cream, combined with an algin, serves to stabilize the product. The same effect is employed to suspend ingredients which are added to milk drinks, for example, the chocolate present in a chocolate milk drink.

Under the usual circumstances attending the reacting of a water soluble alginate with a calcium salt to form the insoluble calcium alginate, the resulting product is either gelatinous in nature or has a grainy, granular consistency, as distinguished from the chewy character which is desired in a confection of the nougat or caramel type. Mineral salt buffers are frequently resorted to in controlling the formation of a candy gel; however, in many instances such buffers are non-nutritive or are prohibited for use in edible products by the Federal Pure Food Laws. Many of the calcium salts used in the above referred to processes are similarly unsuitable for incorporation in a confection.

I have discovered that by using a salt of calcium which is of pure food grade, such as calcium lactate, calcium acetate, calcium tartrate, etc., and which is ionizable in an aqueous medium, the same can be reacted with a water soluble alginate, such as sodium alginate, to produce a plastic, chewy confection, without the use of any acids, buffers, etc. This product is peculiarly characterized by an interlocking or tangled, brushlike, internal structure of insoluble filaments which acts to physically confine the hygroscopic confectionery material. In effect it serves to minutely compartmentize the candy mass in cells of microscopic size, thereby preventing mechanical or structural failure under conditions of elevated temperature or high humidity. The confection is correspondingly stabilized, in the case of certain nougat candies having an aerated characteristic, against disruption of the air cells therein due to extreme changes of relative internal and external pressures such as occur at high altitudes.

It should be kept in mind that the present invention deals exclusively with the production of a plastic, chewy type of confection, as distinguished from other well known types of confection, for example, those having a marshmallow texture, or a sugar-grained and sugar stabilized texture, a jellied texture or hard candies, which do not tend to break down under adverse atmospheric conditions. The chewy confectionery piece which is the subject of the invention can be marketed the year round in any type of weather, since it will easily withstand elevated temperatures (up to 120° F.) and high humidity (over 60 R. H.) without breaking down to a running condition.

In practicing the invention I select a water soluble algin of the type referred to in the patent to Steiner No. 2,441,729, of May 18, 1948, i. e., an alginate of ammonium, magnesium, potassium, sodium or other alkali metal, or the alginate of an organic base such as mono-, di-, or triethanolamine, esters, etc. It is naturally of controlling importance that such aliginate be acceptable for use in a food product under the standards of the Federal Pure Food Laws. Soluble algins of this type are readily available on the market.

The calcium salt, preferably calcium lactate, although other salts such as acetate and tartrate are also suitable, so long as they meet the requirements of the Pure Food Laws as to nutritiveness and purity, should be employed in adequate quantity to make sufficient cations available to produce the desired insoluble, filamentary or cell-like internal candy structure.

Generally considered, the operations involved in performing the method of the invention are as follows: The selected alginate is carefully and completely hydrated in cold water, preferably no higher than 70° F. in temperature, in the proportion of approximately three-fourths of one per cent by weight to the weight of the cooked portion of the batch to be produced. This solution is then pre-mixed in a cold confectionery syrup of any desired composition such as corn syrup and sugar, the temperature of which should not exceed room temperature, after which other necessary ingredients of sugar, dextrose, powdered or condensed milk, coloring matter, etc. are added. The resulting mass is cooked to a desired temperature dependent on the confection in question, for example, in the neighborhood of 250° F., being agitated while cooking. Upon the cooked mass reaching the desired temperature, the calcium salt is added, the amount thereof, though small, being sufficient to insure the complete conversion of the alginate in the cooked mass to an insoluble, calcium alginate form. Alternatively, the cooked, bobbed material referred to above may have added thereto an aerated frappe including, for example, egg albumin, soya protein or gelatin, to which frappe the soluble or insoluble calcium salt has been added, in order to produce a nougat-type confection. The resulting plastic confection, when molded and cooled, is found to have a microscopic, cell-like or filamentary structure of the sort referred to above which is undetectable by the palate, yet which confines the hygroscopic ingredients of the confection against structural failure or running. The confection will withstand high temperatures and saturating humidities for long periods of time. Candy bars of the above composition have been maintained in a test cabinet at 100° F. and at 100% relative humidity for over a year without breakdown of the coated centers. This substantially exceeds the normal shelf life of the confection, under conditions substantially more exacting than it will normally be called upon to withstand.

Typical formulae for the production of chewy confections of the type dealt with by the invention are as follows:

*Non-milk stand-up type caramel*

Hydrate:
    4 lb. sodium alginate
    237 lb. water
Add:
    290 lb. corn syrup
    175 lb. sugar
Cook 252° F.
Add:
    .905 lb. calcium acetate, food grade
    28 lb. vegetable fat

*Milk caramel*

Hydrate:
    .673 lb. sodium alginate
    6.73 lb. corn syrup
    31.927 lb. water
Add:
    36.996 lb. corn syrup
    7.49 lb. brown sugar
Add to above:
    9.943 lb. sugar
    8.597 lb. milk powder or condensed milk
    .319 lb. salt
Cook 236° F.
Add:
    .241 lb. calcium lactate, food grade
    1.36 lb. vegetable fat
    .41 lb. glyceryl mono stearate

*Chewy nougat*

Hydrate:
    3.92 lb. sodium alginate
    237 lb. water

Add:
    293 lb. corn syrup
    169 lb. sugar

Cook 250° F.

Add (in aerated frappe form):
    1.815 lb. soyco
    1 lb. honey
    20.58 lb. corn syrup
    1.5 lb. salt
    .905 lb. calcium acetate, food grade
    15.2 lb. water } Premix and aerate with beater to frappe The successful practice of the present invention relies primarily upon the initial, careful and complete hydration of a predetermined, relatively small amount of the original soluble alginate in cold water, the introduction of the cold solution into mixture with a syrup which is also in an unheated condition, and the provision that the calcium salt subsequently added shall have sufficient free cations to insure thorough conversion of the alginate present to an insoluble, calcium combined form.

The plastic confections produced by the above formulae, in addition to being capable of being marketed the year round regardless of atmospheric conditions, are also resistant to the destructive effect of high altitudes. Many types of aerated confections are shipped by carrier at altitudes over 13,000 feet, tending to rupture the air cells thereof, due to internal and external pressure differential. However, the microscopic, fibrous retaining network or structure which is produced in the present confection resists this tendency. Moreover, the structure referred to is not at all grainy in its effect on the palate, such as is the case with certain candy products containing insoluble calcium alginate. As has been pointed out above, no acids or buffers are used or present, nor are any gel-inhibiting or gel-retarding salts necessary in the production of the confection, such as might be objectionable with regard to the Federal Pure Food Laws. The relatively small percentages of calcium salt and alginate are in no sense sufficient to affect the taste or other eating qualities of the candy.

I claim:

1. A method of making chewy plastic confectionery, comprising completely hydrating a soluble algin with cold water, mixing the resulting solution with certain confectionery ingredients which are suited for chewy confectionery production and which are in a cool condition, cooking the resultant mixture to the consistency of a chewy confectionery cook and, without the use of ionizing or buffer agents, adding to said cooked mixture a sufficient quantity of a calcium salt to entirely convert said algin to calcium alginate form.

2. As a chewy confectionery product, a composition of matter having an amorphous texture and including a non-soluble alginate combined with confectionery ingredients suited for chewy confectionery production, in which said alginate exists as a tangled network of microscopic filaments acting to confine said ingredients and prevent structural failure of the product.

3. As a chewy confectionery product, a composition of matter having an amorphous texture and including a non-soluble calcium alginate combined with hygroscopic confectionery ingredients suited for chewy confectionery production, in which said alginate exists as a tangled network of microscopic fibrous filaments acting to confine said ingredients and prevent structural failure of the product under conditions of elevated temperature or high humidity.

JUSTIN J. ALIKONIS.

REFERENCES CITED

The following references are of record in the file of this patent:

UNITED STATES PATENTS

| Number | Name | Date |
|---|---|---|
| 2,441,729 | Steiner | May 18, 1948 |
| 2,474,019 | Steiner | June 21, 1949 |